Nov. 30, 1926.
L. E. LA BRIE
BRAKE
Filed April 17, 1925
1,608,946
2 Sheets-Sheet 1
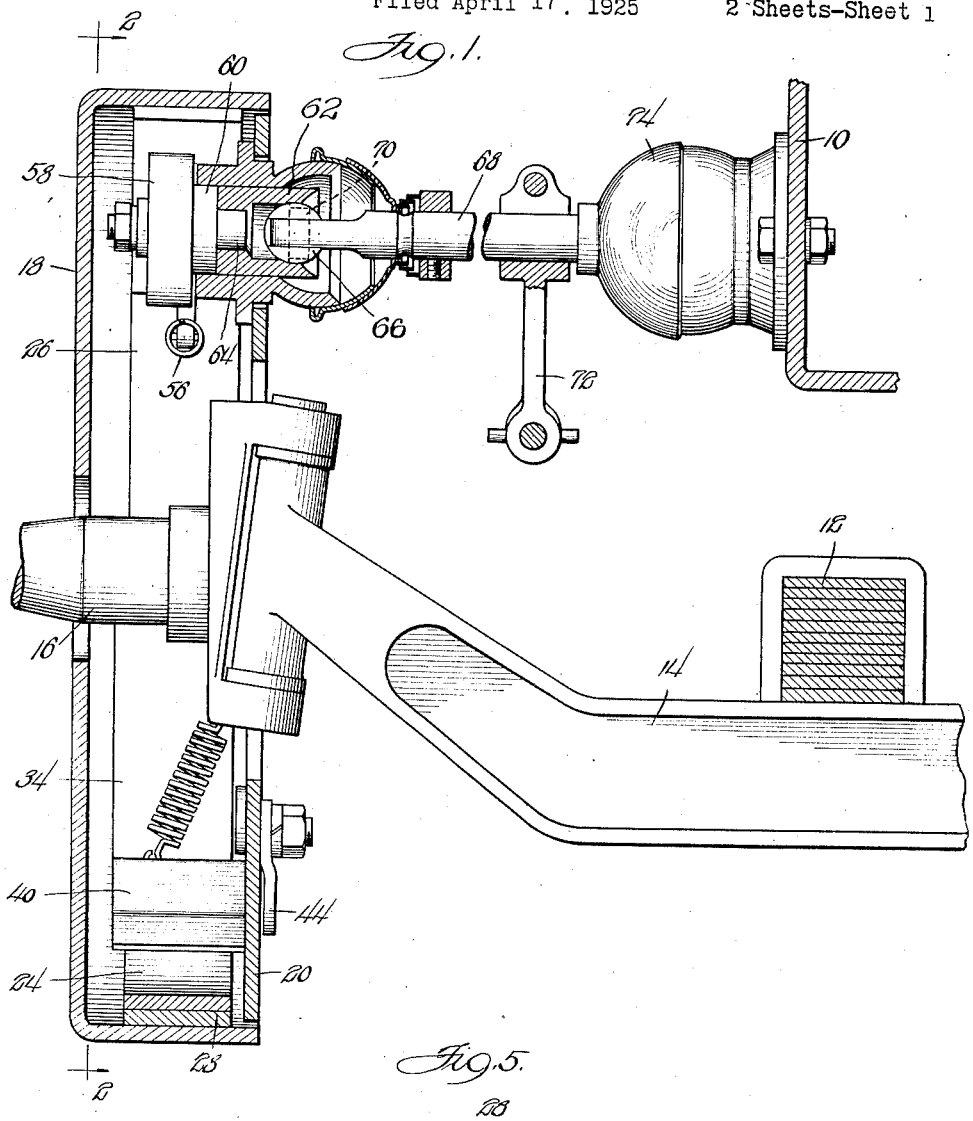
Inventor:
LUDGER E. LA BRIE
By M. W. McConkey
Atty.

Nov. 30, 1926.  
L. E. LA BRIE  
1,608,946  
BRAKE  
Filed April 17, 1925  2 Sheets-Sheet 2
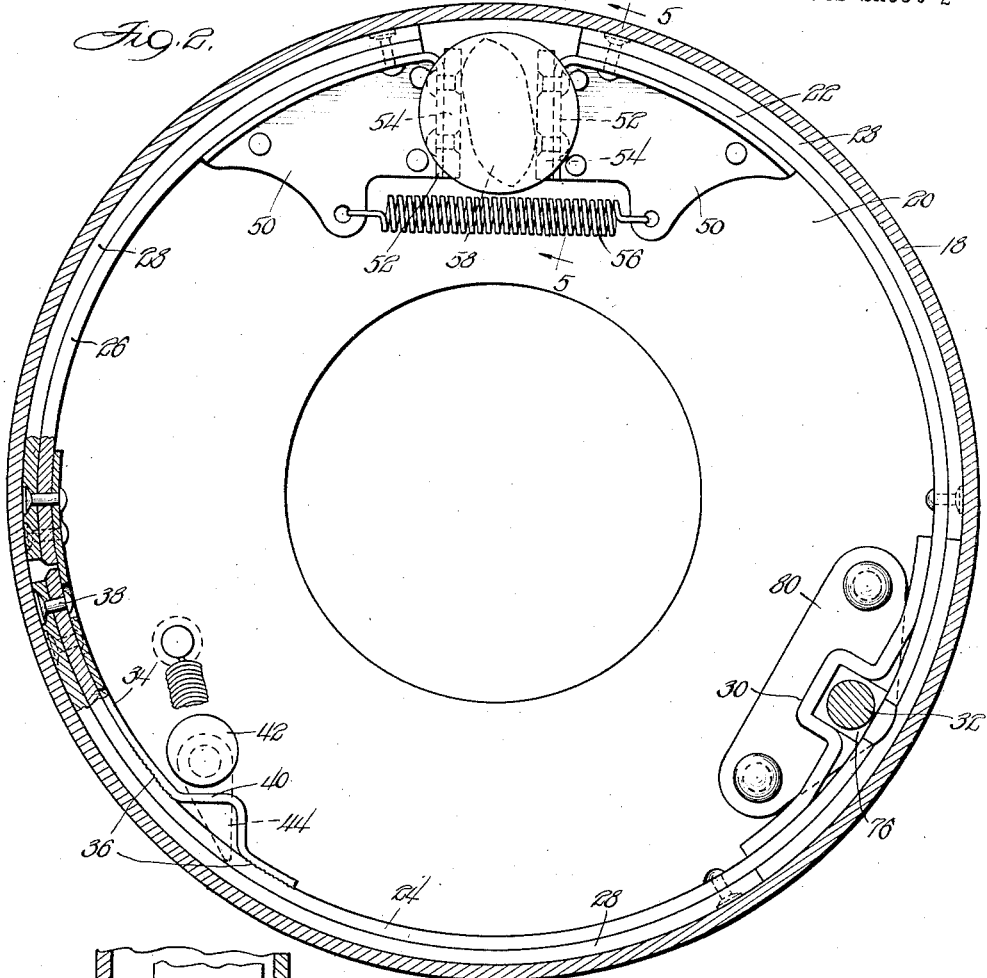
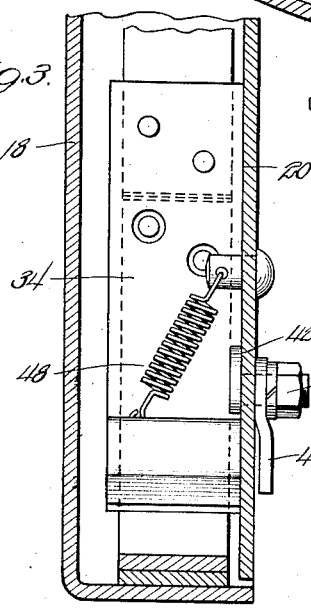
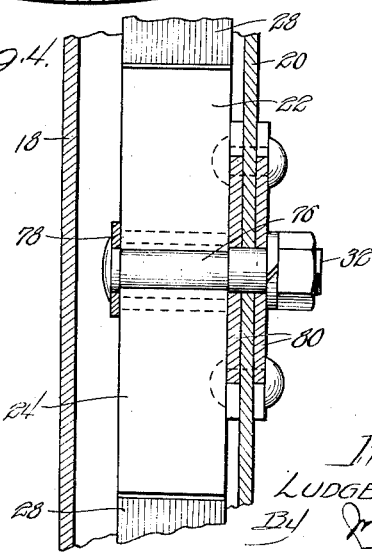
Inventor:
LUDGER E. LaBRIE Patented Nov. 30, 1926.

1,608,946

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed April 17, 1925. Serial No. 23,781.

This invention relates to brakes and is illustrated as embodied in an automobile four-wheel brake system. An object of the invention is to improve the internal expanding band type of brake so that, without interfering with its usefulness for rear wheels, it may safely be used on the front wheels.

Having this object in view, various features of the invention relate to making the band of relatively heavy material, preferably making it in sections connected by novel joints; and to anchoring the band so that the "wrap" when the vehicle is going forward is greater than when it is moving backward, partly because the speed is usually greater when going forward and partly because of the effect on the springs, while at the same time "grabbing" is avoided by having the "wrap" much less than a full circumference.

Other features of the invention relate to a novel stop especially adapted for use in this type of brake, and to other novel combinations of parts and desirable particular constructions which will be apparent from the following description of one illustrative arrangement shown in the accompanying drawings in which:

Fig. 1 is a vertical transverse section through one front brake and associated parts of the vehicle;

Fig. 2 is a vertical section on the line 2—2 of Fig. 1, showing the band in side elevation;

Fig. 3 is a detail sectional view, looking down in plan on one of the novel joints between two sections of the band;

Fig. 4 is a detail sectional view showing the anchor and looking upward and to the left in Fig. 2, just inside the brake drum; and Fig. 5 is a section on the line 5—5 of Fig. 2, showing the novel means for securing to the end of the band a wear or cam plate.

In the arrangement selected for illustration, the invention is embodied in an automobile chassis including a frame 10 supported by springs 12 on a rear axle (not shown) and a front axle 14. Knuckles 16 swivelled by the usual king-pins at the ends of axle 14 support the front wheels (not shown), which are provided with drums 18, the knuckles 16 directly carrying brake supports such as the backing plates 20.

As explained above, the friction device of the brake is in the form of a relatively heavy band, preferably in several sections 22, 24, 26, which may be regarded as semi-flexible shoes, and which are shown as having riveted thereto three pieces 28 of brake lining. This obviates the tendency of the ordinary band to "grab", due partly to its excessive flexibility. Sections 22 and 24 are connected by a lighter and more flexible part 30, spot-welded or otherwise secured thereto, and formed to embrace the anchor 32. Sections 24 and 26 are connected by a light piece 34 of spring material, riveted or spot-welded to the end of section 26, and spot-welded or otherwise secured to section 24 at 36 some distance from its end, so that it may spring to allow section 26 to relieve itself. The heads of rivets 38 are arranged in relatively large openings in the piece 34, to allow this action.

Piece 34 is bent at 40 to engage the eccentric head 42 of a stop provided with an adjusting arm 44 keyed outside of the backing plate 20, and having a nut 46 to clamp it in any desired position of adjustment. A spring 48 urges part 40 against stop 42, and also (Fig. 3) urges the band against the backing plate to hold it laterally. The spring 48 also serves to secure smooth operation by insuring that section 26 engages the drum first and then by its circumferential movement forces section 24 against the drum.

At the adjacent ends of sections 22 and 26 are arranged pairs of stampings 50 of L-shaped cross-section, riveted together back to back (Fig. 5), and having their flanges riveted or otherwise secured to the end of the section 22 or 26. The stampings have out-turned radial flanges 52, to which are riveted the wear or cam plates 54, preferably of hardened material such as steel. These cam plates 54 are held by a spring 56 against a double cam 58 having a non-circular part 60 keyed in a vertical slot across the end of a hollow camshaft 62, the cam also having a stem 64 riveted over on the inside of the camshaft. A pair of members 66, having cylindrical outer surfaces fitting in a cylindrical horizontal cross bore in the end of the camshaft, have inner flat surfaces embracing the flattened end of a shaft 68, to which it is swivelled by a vertical pin 70, the whole forming a universal joint above and in line with the king pin. The shaft 68 is operated by an arm 72, and is slidably supported at its inner end by a universal joint 74 on the chassis frame 10.

The anchor pin 32 passes through a square block 76 embraced by a squared portion of part 30, and yieldingly held therein by slightly overlapping the ends of sections 22 and 24, as appears in Fig. 2, the end of the pin passing through a retaining washer 78, and the part of backing plate 20 which carries the pin being reinforced by inner and outer plates 80.

While one illustrative embodiment of the invention has been described in detail, it is not my intention to limit its scope to that particular embodiment, or otherwise than by the terms of the appended claims.

I claim:

1. An internal expanding band brake comprising, in combination, a drum, a substantially continuous expansible split band of relatively heavy gage within the drum, an anchor for the band spaced approximately 120 degrees from one end of the band and approximately 240 degrees from the other end, brake lining secured to the shorter section of the band, two separate and approximately equal pieces of brake lining secured to the longer section of the band, means acting on the free ends of the band to expand it against the drum, a main spring engaging the free ends of the band and urging them away from the drum, and an auxiliary spring urging the band away from the drum approximately midway of the 240 degrees.

2. A brake as defined by claim 1, in which the band is weakened to form flexible joints between the two pieces of brake lining, and at the anchor.

3. An internal expanding band brake comprising, in combination, a drum, a substantially continuous expansible split band of relatively heavy gage within the drum, an anchor for the band spaced approximately 120 degrees from one end of the band and approximately 240 degrees from the other end, brake lining secured to the shorter section of the band, brake lining secured to the longer section of the band, means for expanding the band against the drum, a main spring engaging the free ends of the band and urging them away from the drum, and an auxiliary spring urging the band away from the drum approximately midway of the 240 degrees.

4. An internal expanding band brake comprising, in combination, a drum, a relatively heavy expansible band made in a plurality of sections and arranged within the drum, a leaf spring lying flat against the adjacent ends of said sections and secured thereto to provide a flexible joint, and means for expanding the band against the drum.

5. An internal expanding band brake comprising, in combination, a drum, a relatively heavy expansible band made in a plurality of sections and arranged within the drum, a spring connecting part secured to the end of the first section and secured to the second section some distance from its end, and means for expanding the band against the drum.

6. An internal expanding band brake comprising, in combination, a drum, a relatively heavy expansible band made in a plurality of sections and arranged within the drum, a spring connecting part secured to the end of the first section and secured to the second section some distance from its end, an adjustable stop, the connecting part being formed to engage the stop to determine the idle position of the band, and means for expanding the band.

7. An internal expanding brake comprising, in combination, a drum, a backing plate at the open side of the drum, and friction means within the drum having three devices spaced approximately 120° apart, viz: (1) an expanding device to apply the brake, (2) a device for taking the braking torque, and (3) an adjustable stop device having between the drum and backing plate a part to determine the idle position of a portion of the friction means and having on the opposite side of the backing plate an arm indicating by its position the adjustment of said stop device.

8. An internal expanding band brake comprising, in combination, a drum, an expansible band within the drum, two pairs of stampings of L-shaped cross-section, each pair secured back to back and having their flanges secured to one end of the band, each pair of stampings also formed at the ends with outturned radial flanges, a wear plate secured to the out-turned flanges of each pair of stampings, and a double cam between and engaging the wear plates.

9. A vehicle having an axle having a knuckle swivelled by a king pin at its end, a wheel having a brake drum and rotatably mounted on the knuckle, and a backing support carried by the knuckle, and comprising, in combination therewith, an expansible friction band within the drum with its free ends at the top, an anchor for the band carried by the support approximately 120 degrees from the top of the band and at the rear of the knuckle, to give a substantially greater wrap when the vehicle is moving forward than when it is moving backward, and means for expanding the band comprising flexible shafting including a universal joint above and in line with the king pin.

10. An internal expanding brake comprising, in combination, a drum, a relatively heavy expanding band within the drum, the band formed in a plurality of sections engaging the drum successively, means for forcing one of the sections against the drum to force by its circumferential movement the next section against the drum, and a spring holding said next section away from the drum until said circumferential movement takes place.

11. An internal expanding brake comprising, in combination, a drum, a relatively heavy expanding band within the drum, an anchor for the band spaced approximately 240 degrees from its free end, means for forcing the free end of the band against the drum to cause it to wrap against the drum, a main spring 56 urging the free end of the band away from the drum, and an auxiliary spring engaging the band approximately midway between the anchor and the free end and insuring that the free end of the band engages the drum first.

12. An internal expanding brake comprising, in combination, a drum 18, an internal expanding band within the drum, the band being in a plurality of sections 22 and 24, a connecting part 30 secured to the adjacent ends of the sections, and an anchor device resiliently held between said part 30 and the overlapping ends of the sections 22 and 24.

In testimony whereof I have hereunto signed my name.

LUDGER E. LA BRIE.